Patented Mar. 24, 1925.

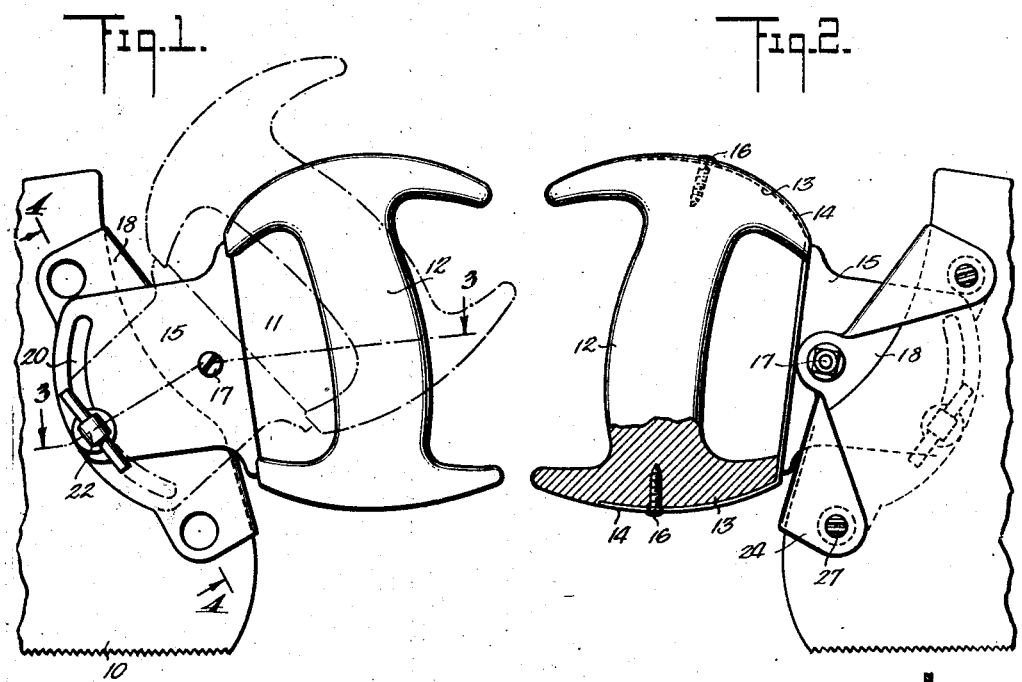
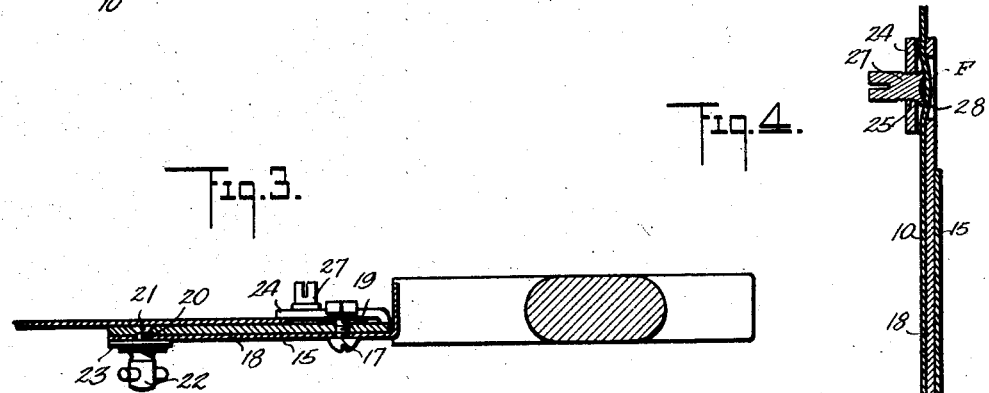
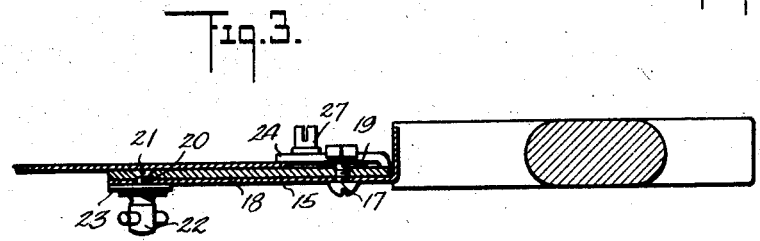
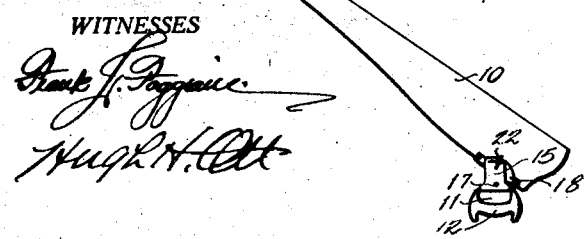

1,531,131

UNITED STATES PATENT OFFICE.

WILLIAM G. PRICE, OF FRACKVILLE, PENNSYLVANIA.

SAW HANDLE.

Application filed November 19, 1923. Serial No. 675,702.

*To all whom it may concern:*

Be it known that I, WILLIAM G. PRICE, a citizen of the United States, and a resident of Frackville, in the county of Schuylkill and State of Pennsylvania, have invented a new and Improved Saw Handle, of which the following is a full, clear, and exact description.

This invention relates to handles for tools and has particular reference to a handle for saws.

The outstanding object of the present invention is to provide a handle which is capable of being readily attached to or detached from a saw blade without the necessity of altering or mutilating the same by forming openings or perforations therein.

As a further object the invention contemplates an improved detachable handle for saws in which means is provided for admitting of limited angular adjustments of the handle after the same is attached to the blade of the saw.

A further object and advantage of the invention resides in the provision of a saw handle which includes means for securely attaching the same to a saw blade whereby the handle may be located at any point on the saw blade in order to allow for the use of the saw in ordinarily inaccessible places such as for overhead work.

As a still further object the invention contemplates a handle for saws which is comparatively simple, strong and durable in its construction, which is inexpensive to manufacture, and which is thoroughly reliable and highly efficient in its purpose.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figure 1 is a side view of a handle constructed in accordance with the invention in applied position and illustrating in broken lines one of the adjusted positions thereof.

Fig. 2 is a reverse side view of the same with parts in section.

Fig. 3 is a sectional view taken approximately on the line indicated at 3—3 in Fig. 1.

Fig. 4 is a sectional view taken approximately on the line 4—4 of Fig. 1.

Fig. 5 is a diagrammatic view illustrating one of the various positions in which the handle may be attached to the saw blade.

Referring to the drawings by characters of reference, 10 designates a saw blade and 11 the improved handle in its entirety. The handle 11 comprises a grip 12 which is preferably constructed of wood or any other suitable material which follows the general outline and contour of the grips that are now in general use. The grip is recessed as at 13 on its opposite outer sides to receive therein the arms 14 forming preferably an integral part of a plate 15, the said arms being secured to the grip by fastening screws 16 passing through openings in the arms and anchored in the grip. The plate 15 is pivotally attached by a suitable bolt 17 to the attaching member 18, said bolt being preferably provided with a friction washer 19 to take up wear. The plate 15 is provided with an arcuate slot 20 concentric to its pivotal point of attachment with the attaching member 18. A clamping screw 21 is anchored in the attaching member 18 and extends through the arcuate slot 20. A thumb nut 22 engages the clamping screw 21 and a washer 23 is interposed between the thumb nut and the plate 18. Under this arrangement it will be obvious that the hand grip 12 is capable of relative angular adjustments with respect to the attaching member 18.

The attaching member consists of a strip of material which is formed with ears 24 bent from one of its edges and lying substantially parallel to the main body thereof. The ears 24 are provided with threaded apertures 25 and the main body of the attaching member 18 is formed with relatively larger openings 26 in alignment with the threaded apertures 25. Clamping screws 27 are arranged in the threaded apertures and are provided with gripping heads 28 at one end and kerfs 29 at the opposite end.

In practice one end of the saw blade is positioned between the ears and the main body of the attaching member 18 with the screws 27 fully retracted. When the attaching member has been properly positioned, a screw driver, wrench or other tool is employed for tightening the clamping screws 27 against the blades, sufficient force being exerted to slightly flex the blade into the openings 26 as indicated at F. It will be found that this effectually and rigidly secures the handle attaching member 18 to the saw blade, positively precluding any relative movement therebetween and this without the necessity of forming openings or apertures in the saw blade, thus permitting the handle attaching member and handle to be shifted or entirely removed from the blade when desired. After the handle attaching member 18 has been secured in the proper place, it will be readily observed that by loosening the thumb nut 22 limited angular adjustments of the handle may be obtained, after which the same is retained in its adjusted position by tightening the thumb nut 22.

From the foregoing it will be seen that an entirely practical and highly efficient detachable handle has been provided for saws or other tools of a similar nature.

I claim:

1. A handle for saw blades comprising an attaching member consisting of a plate having spaced apart ears at one side thereof for embracing and clamping the edge of the blade at any portion thereof, means associated with said ears and plate for rigidly and detachably securing said attaching member to said edge portion, a hand grip pivotally connected to said attaching plate and on its outer face for limited swinging movements in the same plane with the saw blade, and means for clamping said hand grip in its adjusted positions, against said attaching plate.

2. A detachable and adjustable handle for saws comprising an attaching member including spaced parallel portions having alined perforations, means movable through one of the perforations for flexing the blade into the opposite perforation whereby to clamp and grip the attaching member in place on the blade, a hand grip pivotally connected to the attaching member for swinging movements, an arcuate slotted portion in the hand grip concentric to its pivotal point of connection with the attaching member, and clamping means carried by the attaching member and extending through the arcuate slot for retaining the hand grip in its adjusted positions.

3. A detachable and adjustable handle for saws comprising an attaching member including spaced parallel portions having alined perforations, means movable through one of the perforations for flexing the blade into the opposite perforation, whereby to clamp and grip the attaching member in place on the blade, a hand grip pivotally connected to the attaching member for swinging movement, and interengageable means on the hand grip and attaching member for retaining the same in relatively angular adjusted positions.

WILLIAM G. PRICE.